United States Patent [19]
Gill

[11] Patent Number: 5,461,931
[45] Date of Patent: Oct. 31, 1995

[54] MEASUREMENT SYSTEM

[75] Inventor: Michael J. Gill, Milford on Sea, Great Britain

[73] Assignee: British Gas PLC, London, Great Britain

[21] Appl. No.: 87,791

[22] PCT Filed: Sep. 16, 1992

[86] PCT No.: PCT/GB92/01728

§ 371 Date: Nov. 8, 1993

§ 102(e) Date: Nov. 8, 1993

[87] PCT Pub. No.: WO93/06440

PCT Pub. Date: Apr. 1, 1993

[30] Foreign Application Priority Data

Sep. 16, 1991 [GB] United Kingdom ............... 9119742

[51] Int. Cl.$^6$ .................................................. G01F 1/66
[52] U.S. Cl. ................................. 73/861.28; 73/861.27
[58] Field of Search .......................... 73/861.25–861.31

[56] References Cited

U.S. PATENT DOCUMENTS

| | | |
|---|---|---|
| 3,727,454 | 4/1973 | Courty. |
| 3,731,532 | 5/1973 | Courty. |
| 4,364,114 | 12/1982 | Renzel et al.. |
| 4,663,977 | 5/1987 | Vander Heyden. |
| 4,817,615 | 4/1989 | Fukukita et al.. |
| 4,938,066 | 7/1990 | Dorr. |
| 5,035,147 | 7/1991 | Woodward ...................... 73/861.28 |
| 5,052,230 | 10/1991 | Lang et al. ...................... 73/861.28 |
| 5,168,762 | 12/1992 | Gill ................................. 73/861.28 |
| 5,178,018 | 1/1993 | Gill ................................. 73/861.28 |

FOREIGN PATENT DOCUMENTS

| | | |
|---|---|---|
| 0048791 | 4/1982 | European Pat. Off.. |
| 2077968 | 11/1971 | France. |
| 2121452 | 8/1972 | France. |
| 2281571 | 3/1976 | France. |
| 1264836 | 3/1968 | Germany. |
| 1072519 | 11/1964 | United Kingdom. |
| 1315294 | 4/1971 | United Kingdom. |
| 2050603 | 4/1980 | United Kingdom. |
| 2131173 | 11/1983 | United Kingdom. |
| 91/15737 | 10/1991 | WIPO. |

OTHER PUBLICATIONS

Patent Abstracts of Japan, vol. 9, No. 163 (P-371)(1886), 9 Jul. 1985 & JP,A 60–040916 (Shigeru Tanizawa), Mar. 4, 1982 and translation.

Measurement Techniques, vol. 32, No. 9, Sep. 1989, New York, USA, T. K. Ismailov, E.A.: "Sound Speed Meter with Systematic Error Compensation", pp. 911–913.

Instruments and Experimental Techniques, vol. 28, No. 5, Oct. 1985, New York, USA, D. I. Arnol'd, E.A.: "Apparatus for Measurement of Ultrasound Velocity in Liquid Metals at High Temperatures and Pressures", pp. 1173–1177.

Primary Examiner—Richard Chilcot
Assistant Examiner—Elizabeth L. Dougherty
Attorney, Agent, or Firm—Oblon, Spivak, McClelland, Maier, & Neustadt

[57] ABSTRACT

A fluid measurement system includes two transducers which are located in a duct to provide a measuring path through a measuring tube. The transducers are switchable to allow each to be used for both transmission and reception and the speed of fluid passing through the measuring tube will be depedent on the difference in time periods for a signal from the transducers passing with or against the fluid flow. A calibration mechanism employing an auxiliary transducer with its own ultrasonic paths allows accurate measurment of speed of sound values to be determined to the particular system parameters including transducer delay.

22 Claims, 7 Drawing Sheets

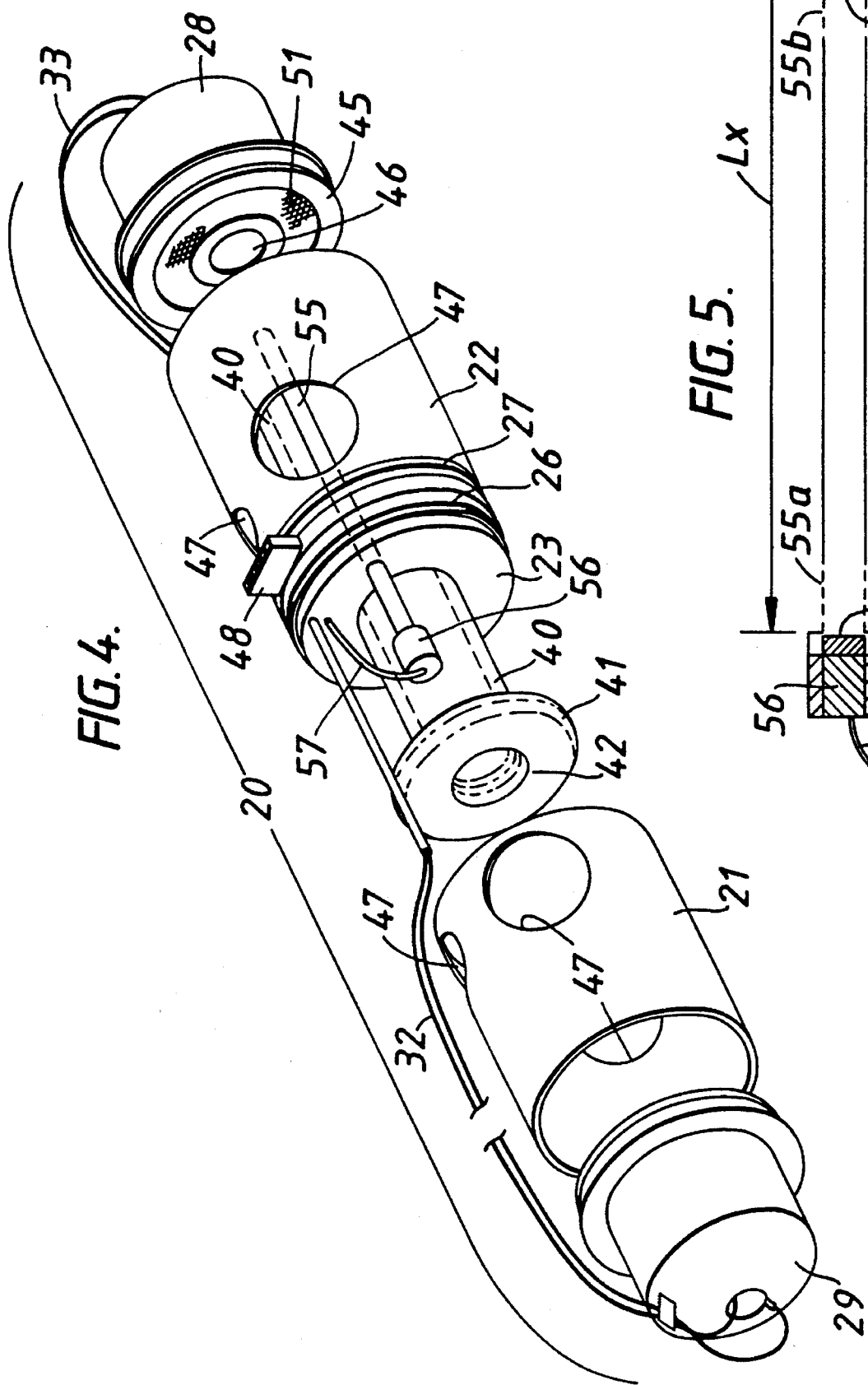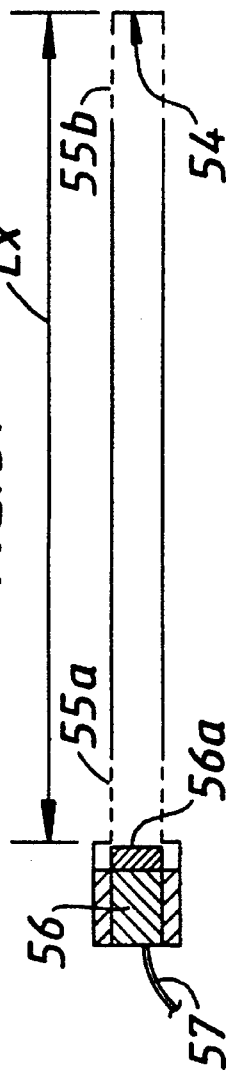

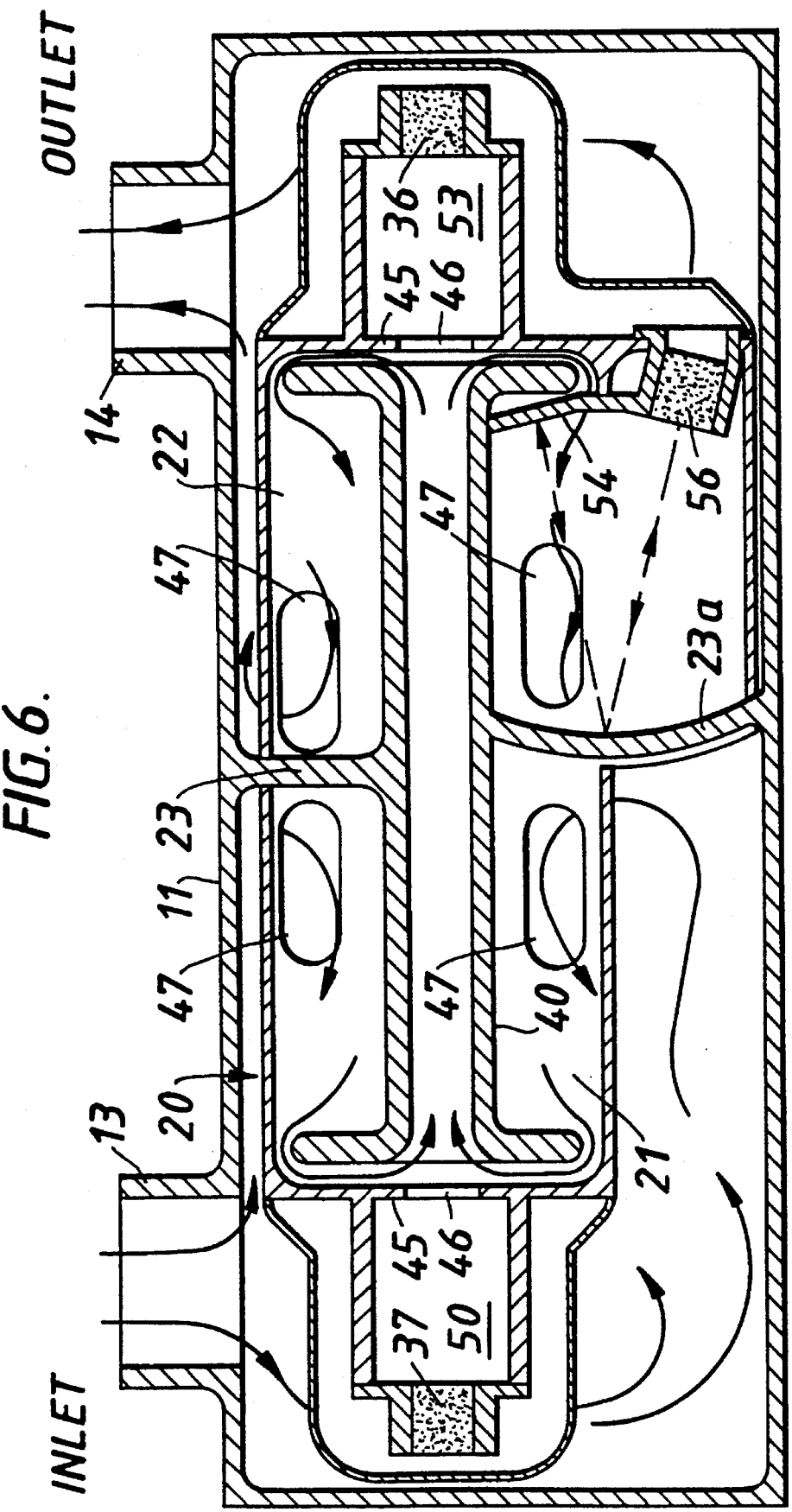

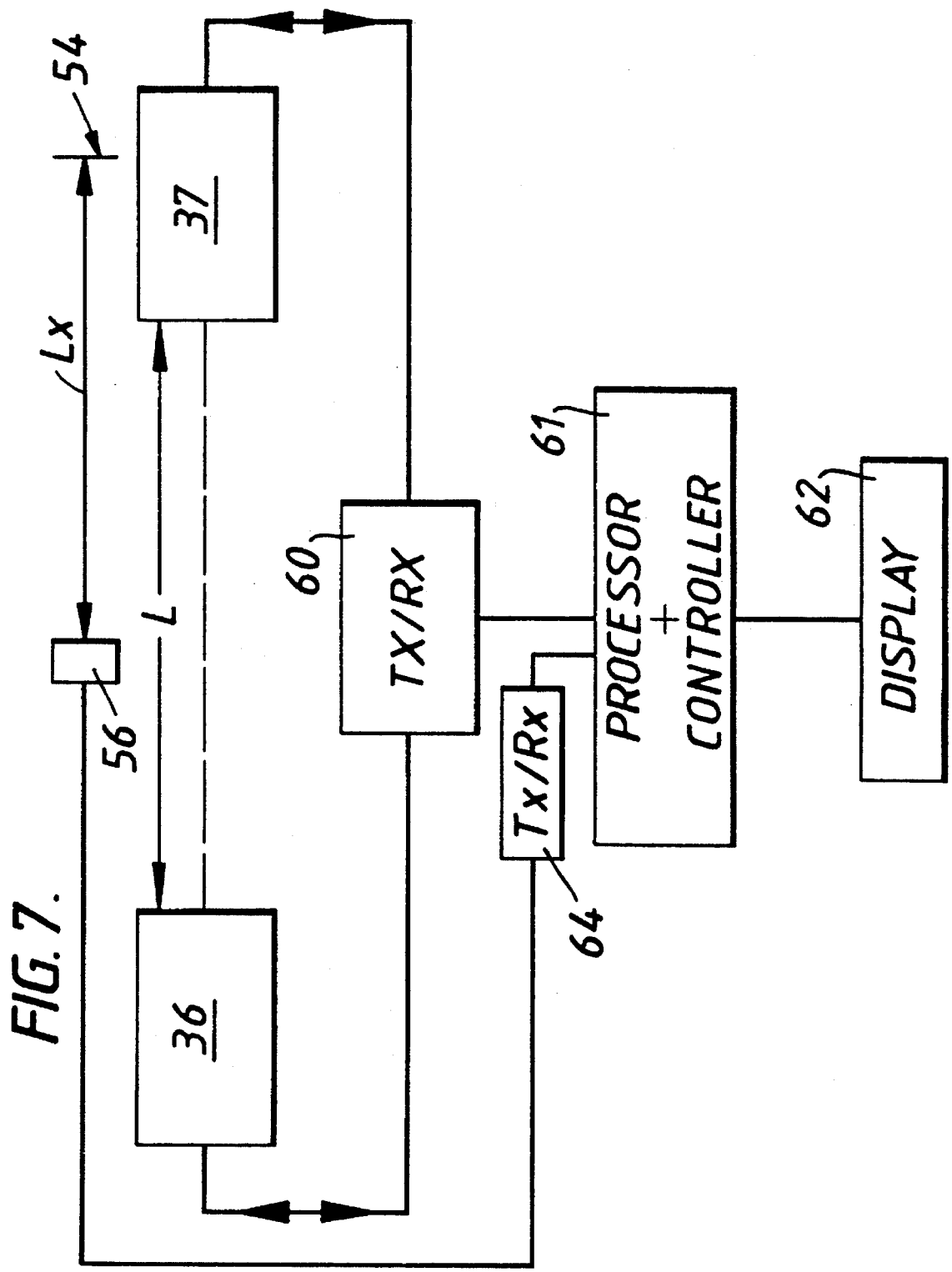

SPEED OF SOUND MEASUREMENT FOR CALIBRATION

MEASUREMENT SYSTEM

The invention relates to a measurement system and more particularly to a system for measuring the speed of fluid to allow flow rate to be determined using transducers.

One system disclosed in our copending patent application (UK 9021441.2) relates to an arrangement for measuring, inter alia, gas flow in a gas meter. The arrangement measures the speed or volume of gas by determining the time of flight of an ultrasonic signal in both directions between first and second transducers disposed opposite each other in a measuring duct and uses this result to compute the gas speed and from this the volume of gas consumed.

The present arrangement is concerned with improvements to such systems to enable even more accurate and/or repeatable results to be achieved.

According to the invention there is provided apparatus for measuring the flow of a fluid, comprising:

a duct with an inlet and outlet for the fluid;

a measuring tube within the duct;

first and second transducers disposed in the duct to define an acoustic path through the measuring tube;

switching means for allowing each transducer to be used for either transmission or reception of a signal used to measure the speed of the fluid through the measuring tube; and correction means for substantially eliminating transducer delay errors to ensure the accuracy of the fluid speed measurement.

Further according to the invention there is provided a method for measuring the flow of fluid through a duct, said method comprising:

transmitting a signal from a first transducer through the flow path of the fluid for receipt by a second transducer;

switching the transducers to allow transmission to be effected by the second transducer for receipt by the first transducer;

determining the speed of flow of the fluid from the transducer signal transmission times; and effecting a correction measurement for substantially eliminating transducer delay errors to ensure the accuracy of the fluid speed measurement.

Further according to the invention there is provided apparatus for measuring the flow of a fluid, comprising:

a duct with an inlet and outlet for the fluid;

a measuring tube within the duct;

first and second transducer means disposed in the duct to define an acoustic path through the measuring tube;

switching means for allowing each transducer means to be used for either transmission or reception of a signal used to measure the speed of the fluid through the measuring tube; and third transducer means for providing a periodic correction measurement by determining the time for a transmitted signal therefrom to pass down two paths of known length for calibration purposes to ensure the accuracy of the fluid speed measurement effected by the first and second transducer means.

Further according to the invention there is provided a method for measuring the flow through a duct, said method comprising;

transmitting a signal from a first transducer through the flow path of the fluid for receipt by a second transducer;

switching the transducers to allow transmission to be effected by the second transducer for receipt by the first transducer;

determining the speed of flow of the fluid from the transducer signal transmission times; and periodically effecting a correction measurement by utilising a third transducer for determining the time for a transmitted signal therefrom to pass down two paths of known length for calibration purposes to ensure accuracy of the fluid speed measurement effected by the first and second transducers.

According to a further aspect of the invention there is provided a device for measuring the speed of sound in a fluid, comprising;

a first transducer;

means defining a first signal path for said first transducer;

means defining a second signal path for said first transducer;

means for transmitting a signal from said first transducer along said first and second paths;

means for receiving the signal from said first and second paths; and means for determining the difference in time taken for the signal to travel said paths to provide speed of sound information independent of transducer delay.

According to a further aspect of the invention there is provided a method for measuring the speed of sound in a fluid, comprising:

transmitting a signal from a first transducer along a first signal path;

transmitting a signal from said first transducer along a second signal path;

receiving the signal from the first and second signal paths; and determining the difference in time taken for the signals to travel said paths to provide speed of sound information independent of transducer delay.

The invention will now be described by way of example with reference to the accompanying drawings in which:

FIG. 4 shows an exploded view of the FIG. 3 arrangement;

FIG. 5 shows the auxiliary transducer and tube assembly in more detail;

FIG. 6 shows an alternative auxiliary transducer configuration;

FIG. 7 shows details of electronic circuitry associated with the flow measurement.

Figure 1:
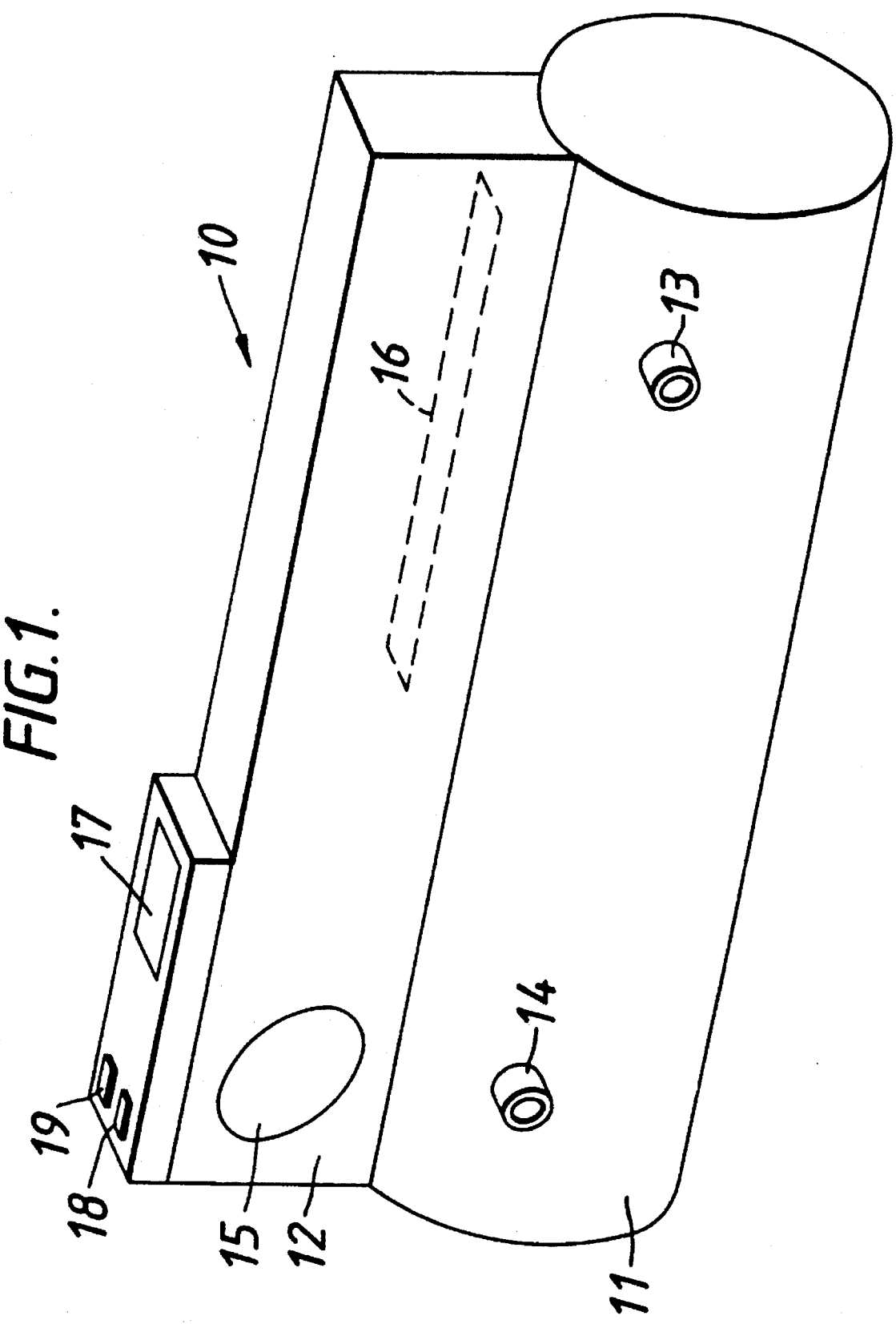
FIG. 1 shows a suitable housing for the invention.

The exterior arrangement of FIG. 1 suitable for the present configuration and for the arrangement disclosed in our copending application UK 9021441.2 comprises a housing 10 incorporating a duct 11 with fluid flow inlet 13 and outlet 14. Above the duct 11 is a second part 12 of the housing 10 which incorporates a battery compartment accessible via plate 15 and includes a circuit board 16 carrying the electronics components for operating the system. A display 17 provides visual indication of the metering and switches 18,19 provide display selection.

Within the duct 11 are a pair of transducers 36,37 (see FIG. 2) which are used to measure the rate of flow within the duct in a manner described in more detail below, to act as a metering device, for example.

Figure 3:
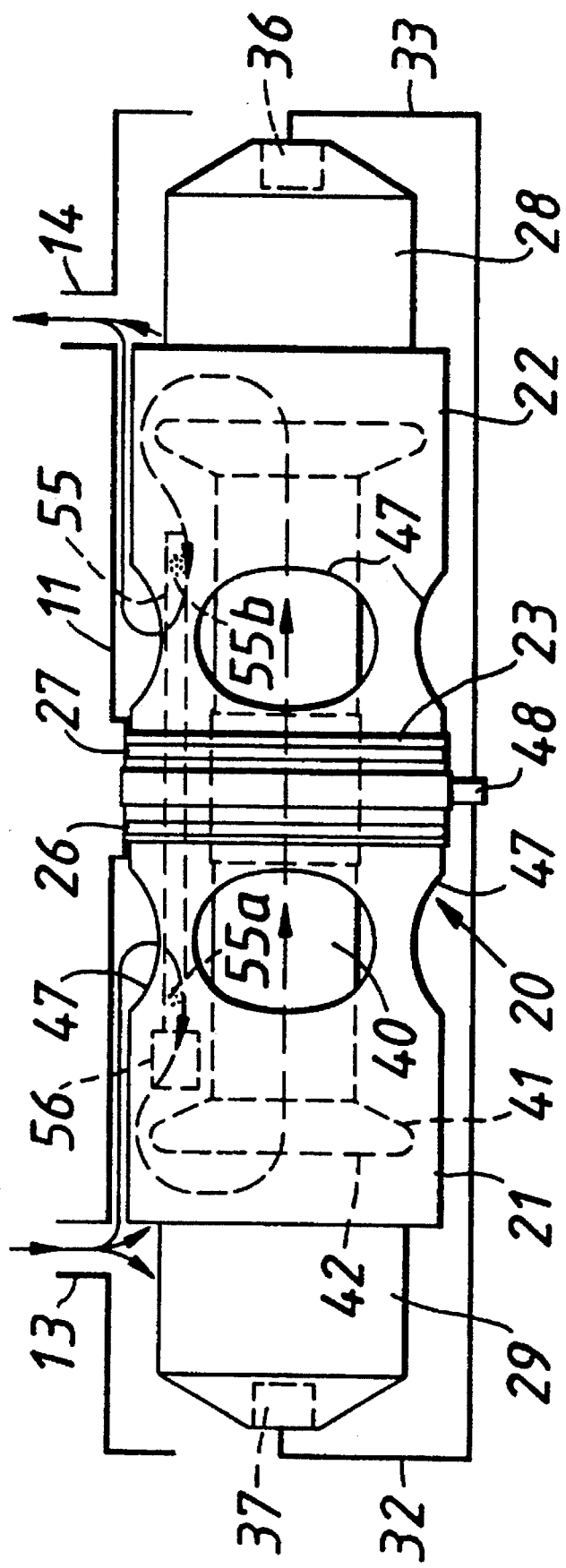
FIG. 3 shows the flow chamber and transducer aspects in more detail.
Figure 8:
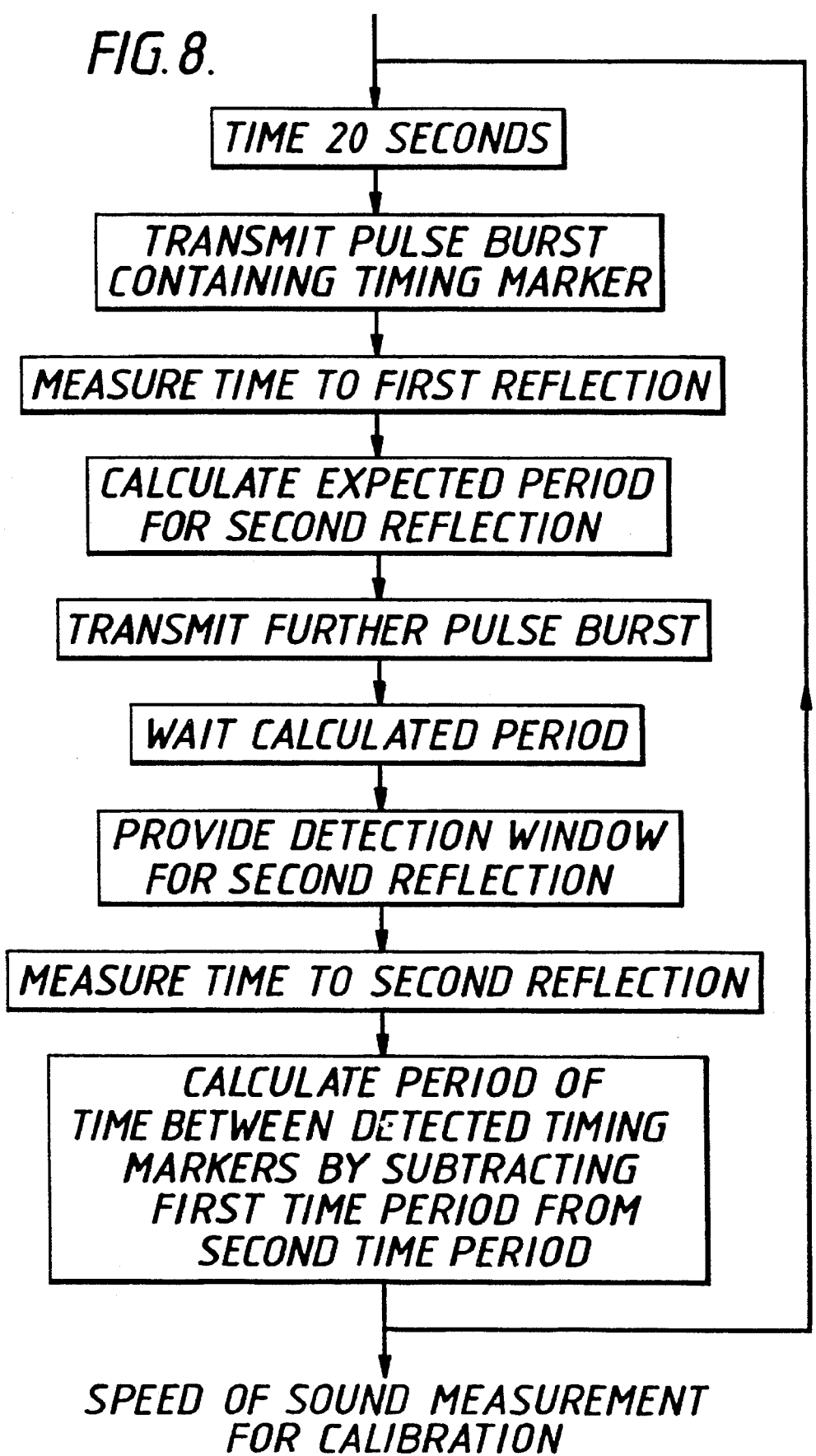
FIG. 8 shows the control and processing steps associated with calibration.

The transducers which operate at ultrasonic frequencies, are incorporated within a flow chamber assembly 20 within the duct (see also FIGS. 3 and 4).

This assembly includes two cylindrical chambers 21,22 which are defined on either side of a central circular support 23. The support also carries an inner, generally tubular member 40 coaxial with the chambers 21,22.

Mounted on the outer periphery of support 23 are two O-rings 26,27 (e.g. of rubber) which effect a seal when mounted within the housing 11. This results in the chambers 21 and 22 being isolated from each other and the only passage therebetween being provided via the tube 40. The tube includes disc-like extensions 41 at each end and the diameter of the bore of the tube increases adjacent each end in the region 42 to provide modifications to the fluid flow path.

The chambers 21,22 each include a number of circular apertures 47 around their periphery to form passageways for the fluid entry or exit.

As can be seen from FIG. 3, the fluid passes into the measuring system at inlet 13 and moves within the housing duct 11 so as to pass around the outside of the chamber 21 and thence through the apertures 47 into the chamber 21. The fluid then continues through the chamber 21 passing over the disc-like extension 41 and through the shaped region 42 of the tube 40. After travelling down the tube 40 the fluid emerges and passes over the extension 41 and passes out through the apertures 47 in chamber 22. External of this chamber, the fluid passes through the housing and through the exit 14. The shape of the tube and the passages act as a labyrinth to reduce turbulent flow as well as preventing dust from passing into the measuring tube which could be present in a domestic gas supply, for example. Instead the dust tends to settle in the bottom of the housing external of the chamber 21.

A relatively narrow bore size in tube 40 causes a speed increase in the fluid to increase the sensitivity of the transducers as well as purging any stray dust particles.

An auxiliary transducer 56 with associated tube 55 is provided within and extending through the chambers 21,22 and is used for calibration purposes as described in more detail below. The tube 55 includes porous end sections 55a,55b to allow very small portions of the fluid to reach the tube interior (e.g. a few ccs). Otherwise, there is no passage of fluid between chambers 21 and 22 except via the measuring tube 40. The central support 23 acts as a seal between the tube 55 and the chambers 21 and 22.

Figure 2:
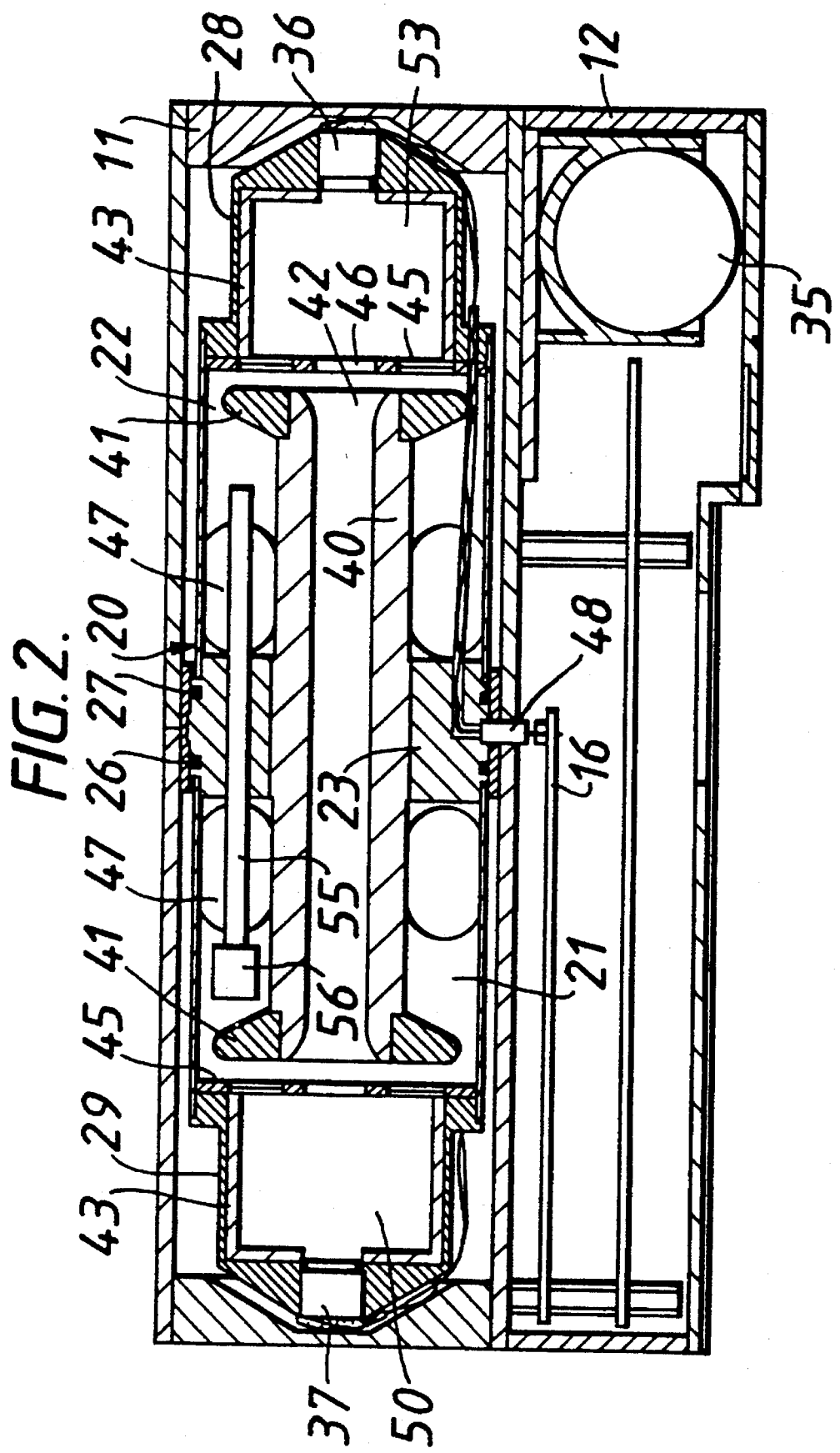
FIG. 2 shows a sectional view of the FIG. 1 housing with the internal component layout.

Extending from the chamber 21 is a transducer housing 29 containing one of the ultrasonic transducers 37. The transducer as seen from FIG. 2 is separated from chamber 21 by partition 45. Thus transducer 37 is located at one end of a chamber 50 and the partition 45 is at the other end of chamber 50. The chamber is lined with acoustic material 43 to avoid unwanted reflections at ultrasonic frequencies.

The partition includes a circular aperture 46 in line with the transducer to allow ultrasonic signals to pass through to the tube 40. The aperture will be covered with gauze 51 (see FIG. 4).

The provision of chamber 50 with only a small aperture allows only generally parallel waves to pass therethrough rather than a divergent beam. The location of the transducer 37 at the far end of the chamber 50 assists with this action and reduces the risk of dust contamination of the transducer. The chamber partition also isolates the chamber from the fluid path.

A similar arrangement is provided for transducer 36 with housing 28 and the chamber 53 with the partition 45. The aperture 46 is again provided. This is necessary as each transducer 36,37 will alternate as transmitter and receiver.

The transducers 36,37 are connected to the electronic circuit board via wires 32,33 and the electrical connector 48. The auxiliary transducer 56 is connected via wire 57 to the connector 48. The power source for the system is provided by battery 35.

The transducer 56 together with the associated tube 55 is shown in more detail in FIG. 5.

The bore of the tube is very small (e.g. 5 mm) compared to the bore of the measuring tube and the porous end sections 55a,55b are only sufficient to allow a small portion of fluid to pass into the tube. Thus any flow through tube 55 is negligible, especially when compared with the flow through the measuring tube 40. However this is sufficient for the tube 55 to contain an accurate sample of the fluid flowing within the measuring tube 40. The wire 57 provides the means for receiving and passing back a signal from the system control.

The auxiliary transducer 56 is arranged to transmit a signal down the tube 55 to the end reflector surface 54 (a distance Lx) which signal is then reflected back the distance Lx making a total distance of 2Lx altogether. A similar process utilising a double reflection is carried out as described below and in this case the total distance is 4Lx altogether. The flat transducer face 56a is employed in that operation. The purpose of the auxiliary transducer and tube is to provide a calibration mechanism for the system for reasons described below.

In an alternative arrangement shown in FIG. 6, the third transducer 56 is provided within the chamber 22. The support 23 in this embodiment is part of the moulding and includes portion 23a having a concave face which acts as a reflector for the transducer 56. A portion 54 of the transducer assembly adjacent the transducer also acts as a reflector as does the face of the transducer 56 itself. The paths of the signals are utilised as in the earlier embodiment.

The provision of the support as part of the moulding allows the reflector to be integrally formed, removes the need for O-rings and reduces the space taken up by the support to allow sufficient room for the transducer 56 and associated paths to be accommodated all within the chamber 22. This eliminates even slight passage of fluid between chambers 21 and 22 (other than via the normal route through the measuring tube).

The transducer and signal paths are thus quite separate from the measurement transducers and measurement tube 40 and eliminates erroneous signals.

Motion of fluid within chamber 22 does not affect this measurement because the reflective path has a component with and against any flow so cancels this out.

The speed of fluid through chamber 22 will be slower in any event to that speed through the measuring tube 40.

In this second embodiment the distance Lx will be the distance from transducer 56 to the face 54 (via reflector 23a).

The 2Lx distance will be that travelled by the signal back on this route after reflection at the transducer 56 ie the signal having undergone a single reflection. The 4Lx distance will be that travelled by the signal having undergone a double reflection.

The auxiliary transducer calibration or correction mechanism is provided for the following reasons.

The velocity V of gas flowing in the main measurement tube may be calculated from the times for the ultrasonic signals to pass therethrough (a distance L) in each direction, according to the velocity formula $$\text{Velocity } V = (L/2)*(T2-T1)/(T1*T2) \quad (1)$$

where the time of flight in each direction is T1 and T2.

Errors in the values of T1 and T2 arise because there will be additional time delays due to electronic circuit delays, the inertia of the transducers and multimode propagation effects in the measurement tube. The inertia of the transducers is the major delay error (typically 80% of the error).

The T2−T1 subtraction will eliminate all these errors in this part of the equation as the delays will be constant in both directions.

The product T1*T2 is not so easily dealt with. It is true that where the measuring tube is sufficiently long, the errors due to the above delays are so small as to be ignored. However for more compact designs, this error becomes more pronounced. If accuracy to a few percent is tolerable, then even with compact designs a fixed correction factor can be introduced into the computation to reduce any error. However for different gases and for extended periods of use (i.e. years) it is better to employ the present calibration mechanism which increases accuracy.

Tg1 and Tg2 are the actual measured transmit times including the error effects described.

That $$T1*T2 = (Tg1-Ts1-Tc1)*(Tg2-Ts2-Tc2) \quad (2)$$

is unhelpful if the values of Ts (system and transducer delay) and Tc (channel or multimode propagation delay) are unable to be actually measured individually.

However by employing the calibration steps using the auxiliary transducer it is possible to determine the value of T1*T2 because $$T1*T2 \text{ is approx.} = T^2 = L^2/C^2 \quad (3)$$

where C is the term relating to the speed of sound measurement for a given fluid, and V is small in relation to C as is the case in practice and T is the value of $T_1$ (or $T_2$) when V is zero ie when V=0, $T^1 = T_2 = T$.

The speed of sound C of a signal in a medium is given by $$C = \frac{D}{T} \quad (4)$$

where D is the distance travelled by the signal and T is the time for which the signal travels.

In the case of the single and double reflection examples above with respect to the third transducer the real time to travel the distance 2Lx in the case of the single reflection is $T_p(2Lx)$, whereas in the case of a double reflection, the real time to travel the distance 4Lz is $T_p(4Lx)$ where 'real time' is the actual time the signal spends in the fluid.

$$T_p(2Lx) = Tx_1 - Tsx \quad (5)$$

$$T_p(4Lx) = Tx_2 - Tsx \quad (6)$$

where $Tx_1$ is the measured transit time to travel the distance 2Lx, $Tx_2$ is the time to travel the distance 4Lx and Tsx is the transducer system time delay error for this transducer which error is similar to the $Ts_1$ and $Ts_2$ errors for the main transducers.

Tsx can be eliminated by subtracting $Tx_2$ from $Tx_1$ as previously described for the main transducers and thus using equation (4) we have $$C = \frac{4Lx - 2Lx}{Tx_2 - Tx_1} \quad (7)$$

$$= \frac{2Lx}{Tx_2 - Tx_1} \quad (8)$$

and finally $$C^2 = \frac{(2Lx)^2}{[Tx_2 - Tx_1]^2} \quad (9)$$

we shall return to equation (9) shortly.

By employing the third transducer with its own measurement chamber or paths and by sending a signal in a controlled manner thereto, it is possible to eliminate the value of T1*T2 because we have determined in equation (9) that $C^2 = (2Lx/[Tx2-Tx1])^2$ and hence substituting equation (9) in equation (3) to eliminate C we have $$T1*T2 = [Tx2-Tx1]^2 * L^2/4Lx^2 \quad (10)$$

where Tx2 is the time taken for the signal from the auxiliary transducer 56 to pass to the end reflector 54 and back to the transducer and reflect thereon back to the reflector 54 and back to the transducer 56 (i.e. a distance 4Lx). A distance of travel for the signal to pass once to the reflector 54 and back (i.e. a distance 2Lx) gives the time value Tx1.

L is the distance of the path in the main transducer measurement chamber 40 of FIG. 3.

If we now insert equation (10) into equation (1) we can eliminate $T_1*T_2$ and therefore the associated system and transducer delays and thus we obtain $$V = \frac{L}{2} \times \frac{(T_2 - T_1) 4Lx^2}{(Tx_2 - Tx1)^2 \cdot L^2} \quad (11)$$

and finally $$V = \frac{2(T_2 - T_1) Lx^2}{L \cdot (Tx2 - Tx1)^2} \quad (12)$$

The calibration system is arranged to have time windows to receive the various reflected signals and the resultant calculation of equation (10) can be directly substituted for T1*T2, in the equation (1) so eliminating the system errors. By updating the calculation at regular intervals, the speed of sound values for any given fluid passing through the system can be accommodated. So fluids which may change their constituents will not cause problems. Also drift in any of the delay factors over long periods of time (e.g. years) will also be accommodated. Using the above arrangement, accuracy to within 0.5% has been achieved.

The operation of the system is shown in FIG. 7. In this simplified diagram, the transducers are shown spaced by the distance L. The auxiliary (calibration) transducer 56 is shown spaced from the reflective end wall 54 by the distance Lx. To describe the operation of the main transducers first, a transmitter/receiver block 60 employs transducer 36 to transmit a signal burst and after this has passed through the tube 40 of FIG. 3, it is received by transducers 37 which passes the signal via the block 60 to the processor/control 61 (typically a microprocessor). The travel time taken for the ultrasonic signal will depend on the distance L and the speed of the gas. A phase reversal marker can be provided on the signal to more accurately detect the time of flight of the ultrasonic signal burst. The transducer operation is then reversed and transducer 37 becomes the transmitter. The time of travel of the burst is again computed. The difference in time relates to the gas flow rate.

To calibrate, a transmitter/receiver block 64 also typically using a signal with the phase reversal marker is utilised periodically to energise the transducer 56. The utilisation could be every 20 seconds (as against the main transducer measurements for example occurring every 2 seconds). On transmission of the signal burst, the time to receive the first reflection is measured and the period when the second reflection can be expected is calculated in processor 61 to provide a time window for receipt (to eliminate detected unwanted reflections) when a further burst is transmitted.

These detected time values which are dependent on the distance Lx and the gas content are passed to processor/ control 61 to calculate values used in the volume determination. Thus the measurement effectively eliminates the unknowns including system (ie electronics and multimode effects) and transducer delays to give an accurate measurement of speed of sound in the medium. The double transmission steps using the same transducer makes this possible. As the distance L between the main transducers is known, the necessary values can be calculated and volume and usage of gas accumulated. Results can be passed to display 62. The calibration factor can be stored within block 61 and periodically updated as necessary.

The control and processing steps associated with the calibration system are shown in FIG. 7.

I claim:

1. Apparatus for measuring the flow of a fluid, comprising;
    a duct with an inlet and outlet for the fluid;
    a measuring tube within the duct;
    first and second transducers disposed in the duct to define an acoustic path through the measuring tube;
    switching means for allowing each transducer to be used for either transmission or reception of a signal used to measure the speed of the fluid through the measuring tube; and
    correction means for substantially eliminating transducer delay errors to ensure the accuracy of the fluid speed measurement.

2. Apparatus as claimed in claim 1, wherein the correction means is configured to measure the time for a transmitted signal to pass along two paths of known length.

3. Apparatus as claimed in claim 2, wherein each path includes at least one reflective surface to cause said signal to return at least one to a point from which the signal originated.

4. Apparatus as claimed in claim 2, wherein the correction means includes an ultrasonic transducer for transmitting the signal down the two paths.

5. Apparatus as claimed in claim 4, wherein the transducer is provided in addition to the first and second transducers.

6. Apparatus as claimed in claim 4, wherein the transducer is provided with acoustic paths separate to that within the measuring tube.

7. Apparatus as claimed in claim 6, wherein the acoustic paths are provided within a chamber having a restricted inlet and outlet to allow only a small portion of fluid to be utilised for calibration correction relative to the measurement tube.

8. Apparatus as claimed in claim 7, wherein the chamber includes a reflective surface at the end remote from the transducer.

9. Apparatus as claimed in claim 6, wherein the acoustic paths are provided within a chamber having a plurality of reflective surfaces to cause the acoustic paths to be provided within a relatively small region.

10. Apparatus as claimed in claim 7, 8 or 9, including computation means for providing a calibration correction value dependent on the difference in times for a signal to pass from the transducer to the reflective surface on more than one journey.

11. Apparatus as claimed in claim 10, wherein the computation means is configured to determine time windows for reception of a signal to avoid detection of unwanted reflected signals.

12. Apparatus as claimed in claim 10, wherein the computation means is configured to carry out the correction at less frequent intervals to that of the speed measurement.

13. Apparatus as claimed in claims 7 or 8, wherein the chamber is provided within the duct in a position parallel to the measuring tube.

14. Apparatus as claimed in claim 13, wherein the chamber and the measuring tube each have first and second portions contained within separated portions of the duct associated with the inlet and outlet of the fluid respectively.

15. A method for measuring the flow of fluid through a duct, said method comprising:
    transmitting a signal from a first transducer through the flow path of the fluid for receipt by a second transducer;
    switching the transducers to allow transmission to be effected by the second transducer for receipt by the first transducer;
    determining the speed of flow of the fluid from the transducer signal transmission times; and
    performing a correction measurement for removing transducer delay errors to ensure the accuracy of the fluid speed measurement,
    wherein the correction step is performed by measuring the time for a signal transmitted by a third transducer to pass down two paths of known lengths separate to those from the first and second transducers.

16. A method as claimed in claim 15, including reflecting the signal from at least one reflective surface to return the signal to a point from which the signal originated.

17. A method as claimed in claim 16, including computing a calibration correction value dependent on the difference in times for a signal to pass from the third transducer to at least one reflective surface on more than one journey.

18. A method as claimed in claim 17, wherein the computing step includes providing a time window for reception of a signal to avoid detection of unwanted reflected signals.

19. Apparatus for measuring the flow of a fluid, comprising;
    a duct with an inlet and outlet for the fluid;
    a measuring tube within the duct;
    first and second transducer means disposed in the duct to define an acoustic path through the measuring tube;
    switching means for allowing each transducer means to be used for either transmission or reception of a signal used to measure the speed of the fluid through the measuring tube; and
    third transducer means for providing a periodic correction measurement by determining the time for a transmitted signal therefrom to pass down two paths of known length for calibration purposes to ensure the accuracy of the fluid speed measurement performed by the first and second transducer means.

20. Apparatus as claimed in claim 19, wherein the third transducer means includes at least one reflective surface associated therewith to provide two paths of dissimilar overall length.

21. A method for measuring the flow through a duct, said method comprising;

transmitting a signal from a first transducer through the flow path of the fluid for receipt by a second transducer;

switching the transducers to allow transmission to be effected by the second transducer for receipt by the first transducer;

determining the speed of flow of the fluid from the transducer signal transmission times; and periodically performing a correction measurement by utilising a third transducer for determining the time for a transmitted signal therefrom to pass down two paths of known length for calibration purposes to ensure accuracy of the fluid speed measurement effected by the first and second transducers.

22. A method as claimed in claim 21, wherein the correction step is performed by utilising at least one reflective surface to provide two paths of dissimilar overall length.

* * * * *